July 10, 1951 M. O'FARRELL 2,560,239
AIR LINE OILER
Filed June 1, 1949
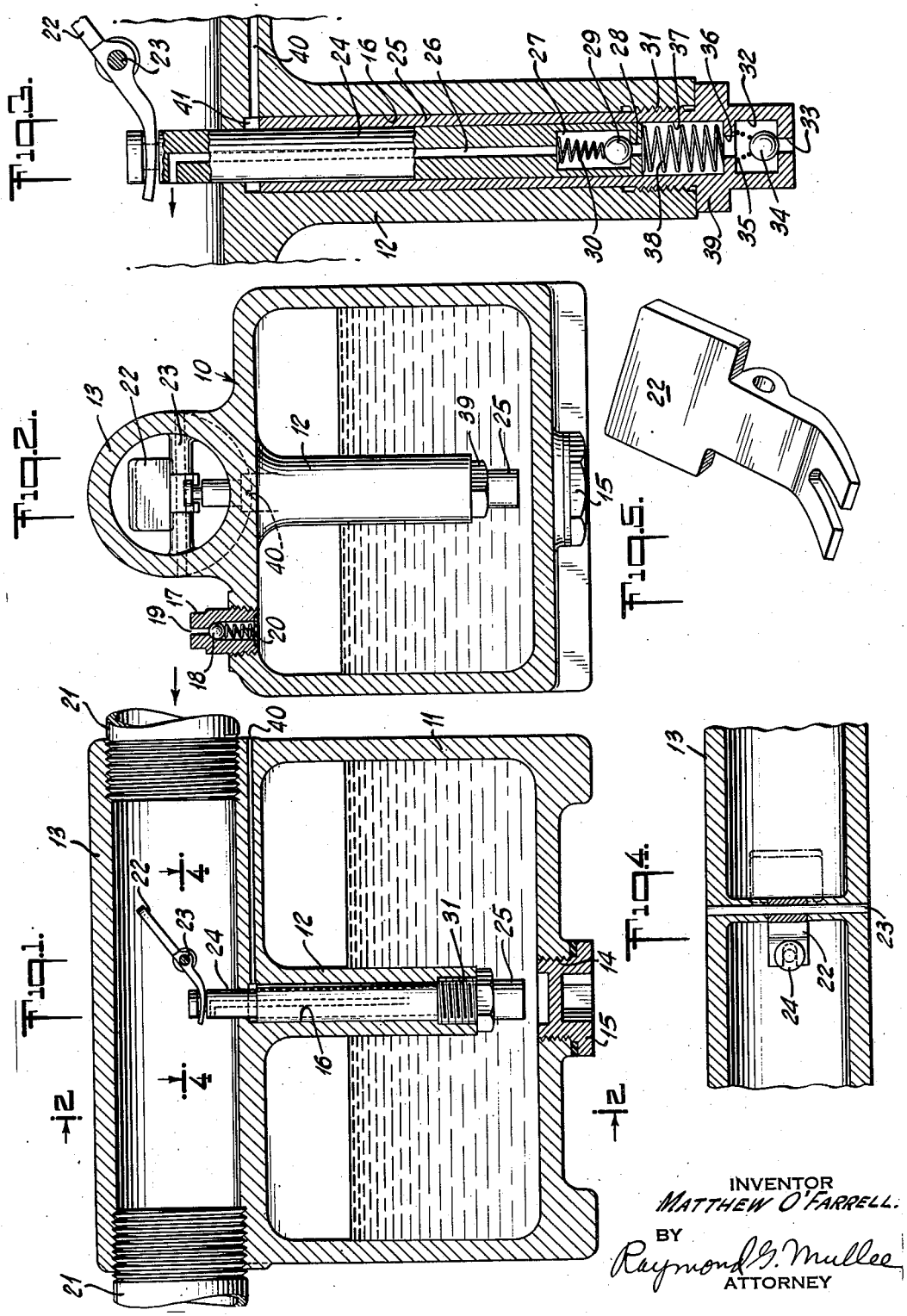
INVENTOR
MATTHEW O'FARRELL
BY
Raymond G. Mullee
ATTORNEY Patented July 10, 1951

2,560,239

UNITED STATES PATENT OFFICE 2,560,239

AIR-LINE OILER

Matthew O'Farrell, Detroit, Mich., assignor to Chicago Pneumatic Tool Company, New York, N. Y., a corporation of New Jersey Application June 1, 1949, Serial No. 96,579

4 Claims. (Cl. 184—55)

This invention relates to lubricating devices and more particularly to an air line oiler which supplies a measured amount of lubricant to the compressed air stream leading to a rock drill or pneumatic tool.

The conventional type of air line oiler in present use generally provides for the constant introduction of lubricant into the air stream during the entire period of tool operation. It also frequently happens in an air line oiler of such type that the air pressure in the reservoir thereof, is equal to the static pressure of the air stream when the tool is not in operation. Thus when the tool operation begins, there is a sudden drop in the air pressure at the reservoir orifice which connects said reservoir to the air stream, and the air pressure in the reservoir forces out a slug of lubricant of a variable and usually too large size. While such air line oilers have points of advantage, it is believed that too frequently they tend to overlubricate, resulting in waste of lubricant, higher maintenance cost, and less efficient tool operation.

The main object of this invention is to provide an air line oiler which automatically supplies a measured amount of lubricant to the compressed air stream of a tool, each time the throttle valve of said tool is opened.

Another object of the invention is to provide an air line oiler which is simple in structure, has low maintenance cost, and promotes more efficient tool operation.

Other objects and features of the invention will be apparent from the following description when read in conjunction with the accompanying drawing, wherein:

Fig. 1 is a longitudinal section of an embodiment of the invention;

Fig. 2 is a cross section as seen from line 2—2 of Fig. 1;

Fig. 3 is an enlarged sectional view of the plunger arrangement of the invention;

Fig. 4 is a partial section view as seen from line 4—4 of Fig. 1, looking downward; and, Fig. 5 is an enlarged perspective view of a plunger actuating member of the invention.

In the illustrative embodiment of the invention the air line oiler generally indicated as 10, comprises a reservoir 11, a plunger portion 12, and an air conduit portion 13.

The reservoir 11 is a totally enclosed container of any desired capacity, having the plunger portion 12 projecting downwardly from the top inner surface and ending a short distance from the bottom inner surface. In the lower wall of the reservoir 11, and directly below the plunger portion 12, is an opening 14 which is threaded to receive a plug 15. The purpose of the opening 14 is two-fold namely, to provide a means for finish machining a bore 16 in the plunger portion 12, and to provide an auxiliary means for filling the reservoir with lubricant. In the upper wall is arranged an opening having a filler plug 17 which can be removed for the convenient filling of the reservoir. As the outflow of lubricant from the reservoir tends to create a pressure lower than that of the atmosphere, a check valve 18 embodied in filler plug 17, allows the inflow of air from the atmosphere through passage 19 to compensate for this loss and thus establish equilibrium, spring 20 maintaining valve 18 normally in closed position.

The air conduit portion 13 extends across the top of the reservoir 11, is tubular in form and has a threaded section at each end for connection with air line 21. Positioned within the conduit portion 13, is a plunger actuator 22 in the form of a vane or paddle, which is pivotally mounted to rotate about mid-portion, by means of a hub and shaft arrangement 23 extending transverse the conduit portion 13. The lower end of the actuator 22 is forked to engage an end of a plunger 24, which is slidably positioned in a bushing 25 located in the bore 16 of the plunger portion 12.

The plunger 24 has a passageway 26, the upper end of which opens within the conduit 13, the lower end terminating in a chamber 27 which has an aperture 28 in the bottom surface. A ball type check valve 29 within chamber 27 is normally held against the aperture 28 by means of a compression spring 30.

Bushing 25 is maintained within the plunger portion 12 by means of threads 31 located toward the lower end thereof and which engage mating threads in the end of the plunger portion 12. At the lower end of the bushing 25 is a chamber 32 having an aperture 33 in the bottom surface, and containing a ball type check valve 34 which is normally held against the aperture 33 by means of a compression spring 35. Another aperture 36 is located in the top surface of chamber 32. It is to be noted that aperture 33 is open to lubricant in the region near the bottom of the reservoir, and further, that springs 30 and 35 have tapered diameters to allow compression to a maximum amount. Just above the chamber 32, is a chamber 37 which is of variable volume and is defined by the top surface of chamber 32, the bottom surface of plunger 24 and the approximate diameter of the plunger 24. Apertures 28 and 36 connect with chamber 37. Positioned within chamber 37 is a compression spring 38 which is arranged to urge plunger 24 toward a non-operative position. A shoulder 39 located on the exterior surface of bushing 24 in the region of chamber 37, is adapted to abut the bottom end of plunger portion 12. In order to prevent leakage of compressed air into the reservoir 11, a bleeder passageway 40 leads to the atmosphere from a small chamber 41 which surrounds plunger 24.

Considering now the operation of the air line oiler, Figs. 1 and 3 illustrate the relation of the parts in non-operative position, which position will be maintained whether or not compressed air is present in the air conduit 13. When the throttle valve of the tool (not shown) is turned on, air will flow through the conduit from the right as indicated by the arrow in Fig. 1, and immediately the plunger actuator 22 will be rotated about the shaft 23 and approach a vertical position, the forked end of the actuator 22 forcing the plunger 24 downward in the bushing 25. Assume that the plunger arrangement has been primed, that is, lubricant is present in the chambers 32, 37, 27 and passageway 26. Lubricant in chamber 37 is forced by way of aperture 28, past check valve 29 into chamber 27, the lubricant in the latter chamber being driven into passageway 26 and forcing any lubricant therein into the conduit 13 where it is picked up by the air flow and carried to the tool in operation.

When the throttle is turned off, the flow of live air over the actuator 22 ceases, permitting spring 38 to force the plunger 24 upwards to non-operative position, causing a pressure differential between the volume of chamber 37 and the volume above the lubricant in the reservoir, with the result that lubricant will be forced past check valve 34, displacing lubricant in chamber 32 which will flow by way of aperture 36 into chamber 37. The plunger 24 and the actuator 22 thereafter assume original or non-operative position.

It is thus seen that the plunger, in conjunction with the check valves, acts somewhat like a positive deplacement pump, and is so arranged that each time the throttle of the tool is turned on, a given amount of lubricant will be introduced into the air compressed stream flowing to the air operated tool, such amount being constant and independent of the length of time the tool throttle is in "on"-position.

What is claimed is:

1. An air line oiler comprising an enclosed lubricant reservoir having a filling means, and a plunger portion projecting downwardly from the top inner surface and having a bore, a bushing arranged in the bore of said plunger portion, a chamber positioned at the lower end of said bushing and including a check valve means, a conduit portion positioned on the upper surface of said reservoir and adapted to be connected into an air line leading to an air operated tool, a plunger means arranged in part within said bushing and said conduit portion, said plunger means having a chamber positioned at the lower end of said plunger in which is disposed a check valve means, and a passageway extending from the plunger chamber to the end of the plunger located in the conduit portion, said plunger being further positioned in the bushing to form an intermediate chamber between the other chambers, a compression spring positioned in said intermediate chamber and adapted to urge the plunger to non-operative position, and a plunger actuating vane positioned in said conduit portion and adapted to depress said plunger each time air is caused to flow through said conduit portion toward the air operated tool and thereby supply a given amount of lubricant from the reservoir to the air stream.

2. A lubricating device comprising a lubricant reservoir, a conduit portion associated with the reservoir, a plunger arranged in part within the conduit portion and the reservoir and having a chamber at one end and a passageway leading from the chamber to the conduit portion, plunger supporting means for slidably supporting the plunger within the reservoir and having a chamber at the lower end, resilient means in a space separating the lower end of the plunger from the chamber in the plunger supporting means, said chambers being connected to the resilient means space by aperture means, the chamber in the plunger supporting means having another aperture opening unto the interior of the reservoir, a check valve located in each chamber arranged to permit admission of lubricant into the chamber, and a plunger actuating means arranged within the conduit portion and responsive to the flow of pressure fluid therethrough to move the plunger and force a given amount of lubricant into the conduit portion.

3. A lubricating device comprising an enclosed lubricant reservoir, a conduit portion affixed adjacent the reservoir, plunger means arranged in part within the conduit portion and the reservoir and including chamber means at one end and a passageway leading from the chamber toward the other end of the plunger means and having a point of egress within the conduit portion, bushing means positioned within the reservoir for slidably supporting the plunger means and having a chamber at the lower end, spring means in a cavity formed between the end of the plunger means and the bushing chamber, said chambers each having an aperture connecting with the cavity, the bushing chamber having an additional aperture for connection with the interior of the reservoir, check valve means arranged in each chamber to admit lubricant into the chamber, and a plunger actuating means positioned in the conduit portion and responsive to the flow of pressure fluid therein to move the plunger means whereby lubricant is forced from the cavity and plunger chamber through the passageway and into the conduit portion, said spring being adapted to return the plunger means to non-operative position when flow of pressure fluid through the conduit portion has stopped, so that lubricant is caused to flow into the bushing chamber and the cavity.

4. A lubricating device according to claim 3 in which a check valve is arranged in the body of the reservoir to maintain atmospheric pressure within the reservoir.

MATTHEW O'FARRELL.

REFERENCES CITED

The following references are of record in the file of this patent:

UNITED STATES PATENTS

| Number | Name | Date |
|---|---|---|
| 1,156,768 | Fletcher | Oct. 12, 1915 |
| 1,721,231 | Osborne | July 16, 1929 |
| 2,205,559 | Heftler | June 25, 1940 |
| 2,430,361 | O'Farrell | Nov. 4, 1947 |
| 2,497,822 | Martin | Feb. 14, 1950 |